US008789151B2

(12) United States Patent
Manion et al.

(10) Patent No.: US 8,789,151 B2
(45) Date of Patent: Jul. 22, 2014

(54) REMOTE DEVICE COMMUNICATION PLATFORM

(75) Inventors: Todd Ryun Manion, Seattle, WA (US);
Kestutis Patiejunas, Sammamish, WA (US); Junfeng Zhang, Redmond, WA (US); Ryan Yonghee Kim, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1294 days.

(21) Appl. No.: 11/971,417

(22) Filed: Jan. 9, 2008

(65) Prior Publication Data
US 2009/0178124 A1 Jul. 9, 2009

(51) Int. Cl.
*H04L 9/32* (2006.01)

(52) U.S. Cl.
USPC ............ 726/6; 726/2; 726/3; 726/4; 713/156; 709/217; 709/218; 709/229

(58) Field of Classification Search
USPC ........ 726/2–4, 6; 713/156; 709/217, 218, 229
See application file for complete search history.

(56) References Cited

U.S. PATENT DOCUMENTS

| 5,107,443 | A | 4/1992 | Smith et al. |
| 5,923,737 | A | 7/1999 | Weishut et al. |
| 6,144,991 | A | 11/2000 | England |
| 6,222,538 | B1 | 4/2001 | Anderson |
| 6,389,464 | B1* | 5/2002 | Krishnamurthy et al. .... 709/220 |
| 6,686,838 | B1* | 2/2004 | Rezvani et al. ............... 340/506 |
| 7,434,166 | B2 | 10/2008 | Acharya et al. |
| 7,606,603 | B2 | 10/2009 | Brubacher-Cressman et al. |
| 2001/0049787 | A1* | 12/2001 | Morikawa et al. ............ 713/156 |
| 2003/0120784 | A1* | 6/2003 | Johnson et al. ............... 709/228 |
| 2003/0196087 | A1* | 10/2003 | Stringer et al. ............... 713/171 |
| 2004/0003073 | A1* | 1/2004 | Krzyzanowski et al. ..... 709/223 |
| 2004/0103323 | A1* | 5/2004 | Dominic ....................... 713/202 |
| 2004/0250130 | A1 | 12/2004 | Billharz et al. |
| 2005/0149487 | A1* | 7/2005 | Celik .................................. 707/1 |
| 2006/0047531 | A1* | 3/2006 | Leung et al. ...................... 705/1 |

(Continued)

OTHER PUBLICATIONS

Eckel, Erik, "How do I . . . Configure and use Logmein Pro remote access software", Oct. 8, 2007, TechRepublic, pp. 1-15, http://blogs.techrepublic.com.com/howdoi/?p=147 on Jun. 14, 2010.
Monckton, Paul, "LogMeIn Pro", Nov. 13, 2007, ZDNet UK, pp. 1-11, http://www.zdnet.co.uk/reviews/communication-and-collaboration/2007/11/13/logmein-pro-39290730/ on Jun. 17, 2010.

(Continued)

*Primary Examiner* — Saleh Najjar
*Assistant Examiner* — Joseph Pan
(74) *Attorney, Agent, or Firm* — Bryan Webster; Andrew Sanders; Micky Minhas (57) ABSTRACT

Managing via a web portal a remote device from a source device connected to a communication network. A device ID is assigned to the remote device, and a remote management software for remote management of the remote device is not installed on the source device or the remote device. Based on the assigned device ID, a connection is established with the remote device via the communication network. A first instruction is received from a user for authenticating access to the web portal. The user is authenticated in response to the received first instruction. An online status is established for the authenticated user. A second instruction is received from the authenticated user requesting access to the remote device. The device ID of the remote device is validated. The validated device ID is associated with the authenticated user. A connection is established between the remote device and the web portal.

14 Claims, 5 Drawing Sheets

(56) References Cited

U.S. PATENT DOCUMENTS

| | | |
|---|---|---|
| 2006/0218285 A1 | 9/2006 | Talwar et al. |
| 2007/0061674 A1 | 3/2007 | Hansen et al. |
| 2007/0078949 A1* | 4/2007 | Washington et al. ......... 709/217 |
| 2008/0133708 A1* | 6/2008 | Alvarado et al. ............. 709/218 |
| 2008/0134292 A1* | 6/2008 | Ariel et al. ........................ 726/3 |
| 2009/0007250 A1* | 1/2009 | Pouzin et al. ................... 726/10 |
| 2009/0024948 A1 | 1/2009 | Anka |
| 2009/0025055 A1* | 1/2009 | White et al. .................. 725/152 |
| 2009/0070415 A1* | 3/2009 | Kishi et al. .................... 709/203 |
| 2010/0107225 A1* | 4/2010 | Spencer et al. ................... 726/4 |

OTHER PUBLICATIONS

RemotelyAnywhere, "Logmein RemotelyAnywhere User Guide", Apr. 2007, pp. 1-118.

Fitzperich, Amanda, How to Make Your PC Available for Remote Desktop Connection, Oct. 2006, 6 pages, United States.

Microsoft Corporation, Troubleshooting General Remote Desktop Error Messages, Jan. 21, 2005, 7 pages, United States.

Microsoft, How a remote desktop connection affects windows xp professional, Jan. 25, 2006, 3 pages.

\* cited by examiner

REMOTE DEVICE COMMUNICATION PLATFORM

CROSS REFERENCE TO RELATED APPLICATION

This application is related to a co-pending U.S. patent application Ser. No. 11/971,421 entitled "REMOTE DEVICE COMMUNICATION PLATFORM USER INTERFACE" filed Jan. 9, 2008, which is incorporated herein by reference in its entirety.

BACKGROUND

Personal computing devices are transforming how individuals live their lives in the $21^{st}$ century. Personal computers, laptop computers, personal digital assistants (PDA), cellular phones or other devices continue to assist individuals from extensive experiences in electronic document creations, electronic media communications, multimedia enjoyments, or the like. Furthermore, software programs installed in these devices further expand the scope of functionalities in these devices. In addition, users constantly store digital information and data on these devices for quick access and retrieval.

As users store information on the devices, it becomes important for users to be able to remotely access different devices. For example, a user who is working from home at a home computer may wish to access a work computer in his or her office. Currently, various technologies are available that use the Internet to connect these two computers. Typically, these systems would require that both the source computer (e.g., home computer) and the destination computer (e.g., work computer) install a proprietary software program. Once the software is installed, the user needs to ensure that the destination computer is turned on and is connected to the Internet. The user next is situated at the source computer and executes the installed software to establish a connection between the source computer and the destination computer. This connection enables the user to access and retrieve information from the destination computer while the user is physically present at a location of the source computer.

While these existing technologies facilitate the users to enable a remote access of a remote device, these technologies continue to require that a connection software is required to install on either the source computer or the destination computer, or both before such direct connection is possible.

SUMMARY

Embodiments of the invention overcome the deficiencies of technologies by establishing a direct connection between a source computer and a destination computer without a client-side or (remote management) software installed on the remote device or the source device for remote management of the remote device from the source device. Aspects of the invention present a straight-forward and efficient platform for first registering a device under a user's online account. The user's online account is maintained by a server and is accessible via an internet browser. The user may travel to various locations remote from the registered device and log into the user's online account from any available Internet-connected device. Once the user is logged on, the user may conveniently select the registered device and access/retrieve information or data stored in the registered device.

This Summary presents a simplified disclosure in order to provide a basic understanding of embodiments of the invention to the reader. This summary is not an extensive overview of the disclosure and provides an introduction to a selection of concepts in a simplified form that are further described below in the Detailed Description. This Summary is not intended to identify key or critical features or essential features of the claimed subject matter, nor is it intended to be used as an aid in determining the scope of the claimed subject matter. Its sole purpose is to present some concepts disclosed herein in a simplified form as a prelude to the more detailed description that is presented later.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Embodiments of the invention improve on existing remote device management systems and technologies by providing a convenient remote device management system based on the internet and a web portal. In one embodiment, a management of remote devices involves accessing, retrieving, and/or modification of data or information of a remote device. In one example, the management may include servicing, such as repair, troubleshooting or the like by someone remotely located from the remote device. In another example, management includes performing activities as if a user is physically at the location of the remote device.

Figure 1:
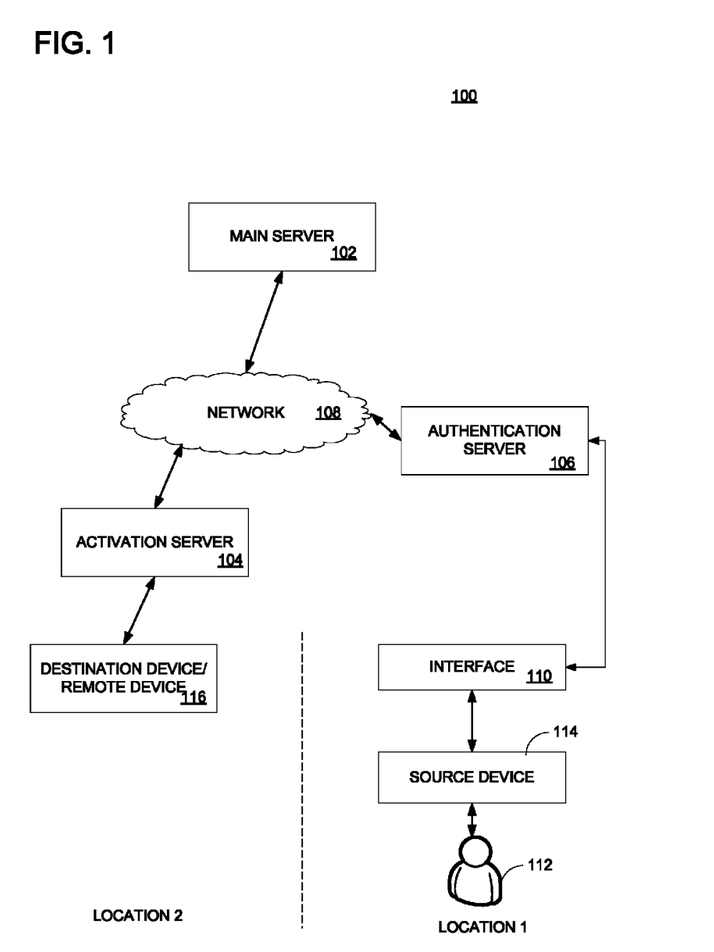
FIG. 1 is a block diagram illustrating an exemplary system for a web-based remote device management according to an embodiment of the invention.

FIG. 1 is a block diagram illustrating an exemplary system for a web-based remote device management according to an embodiment of the invention. FIG. 1 includes a main server 102, an activation server 104, an authentication server 106, and a communication network 108. In one embodiment, each of the main server 102, the activation server 104, and the authentication server 106 includes at least one of the following: a computing device, a cluster of computing devices, a server, and a cluster of servers. In another embodiment, the system 100 further includes other networked computing devices, such as a database, a database server, and the like. In an alternative embodiment, the main server 102, the activation server 104, and the authentication server 106 are part of an enterprise or a federated system having one or more other server computers. In another example, the main server 102 may be a web server hosting one or more web pages over an intranet, internet, or the Internet. The system 100 also includes the communication network 108 for connecting the main server 102, the activation server 104 and the authentication server 106. For example, the network 108 may be a wired or wireless network connecting the servers 102-106 together.

Figure 4:
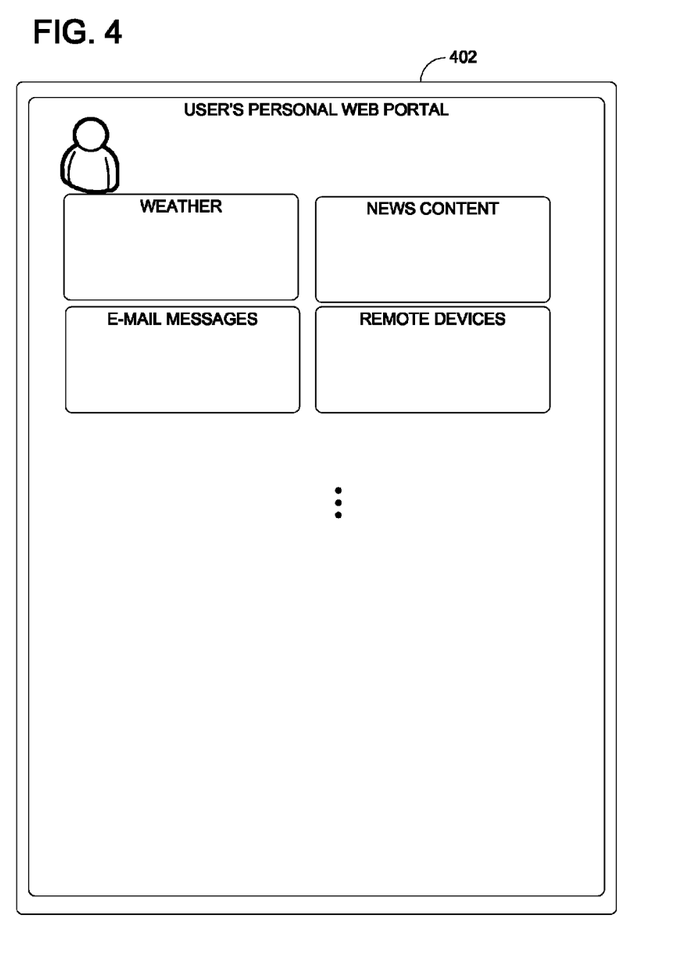
FIG. 4 is an exemplary screen shot illustrating an interface according to an embodiment of the invention.

The system 100 includes an interface 110 for interacting the main server 102 with one or more users, such as a user 112. For example, the interface 110 may be a user interface (UI) or a graphical user interface (GUI) that receives instructions or commands from the user 112 for activating or operating programs or services available on the main server 102, the activation server 104 and/or the authentication server 106. In the example where the main server 102 is or is part of a web server, the interface 110 may be a web page or a web portal providing a number of services to the user 112. In another embodiment, the interface is associated with an online account of the user 112 and the online account is hosted or provided by the main server 102. In one example, the online account may include an electronic e-mail (e-mail) of the user 112, a personalized information page of the user 112, an instant messaging account associated with the user 112, or the like. (See also FIG. 4).

Initially, the user 112 has one or more devices to operate for the user's needs. For example, the user 112 may have a computing device at home, a computing device at work, a portable device, such as a PDA or a cellular phone, storing his personal contact information and/or multimedia files. While some of these devices are portable, some of the devices are not and thus require a physical presence at a location of the device in order to access the information or data stored therein. Alternatively, the user 112 may request someone else who is currently at the location of the devices to help the user 112 access the desirable information. However, in certain situations, this is not desirable due to sensitive information or that the person may not be knowledgeable in operating the computing device. For example, the remote device 116 is to be serviced remotely and the person locating at the location of the remote device 116 may have limited or no knowledge of the remote device 116 that is helpful to the user 112. Therefore, it is desirable for the user 112 to have a remote access of devices when the user 112 is physically remote to the devices.

Currently systems typically require the user 112 to install client software or a client-side or a remote management application program on either a source device 114 or a destination device 116 or both before such access is allowed. For example, the source device 114 is a device located at the location of the user 112 (e.g., location 1) and the remote device 116 is located at a location (e.g., location 2) that is remote with respect to the location 1. Based on these limitations in the existing technologies, once the client-side or remote management application is installed or activated, the user 112 may start the remote access of the remote device 116 from the source device 114.

Aspects of the invention enable a convenient web-based remote device management system without requiring the user 112 to install a client-side or remote management application on either the source device 114 or the remote device 116. Embodiments of the invention enable the user 112 associate or add one or more devices to the an online account associated with the user 112 such that the user 112 may access the remote devices via a web portal or web page through an internet browser from any location.

Figure 2:
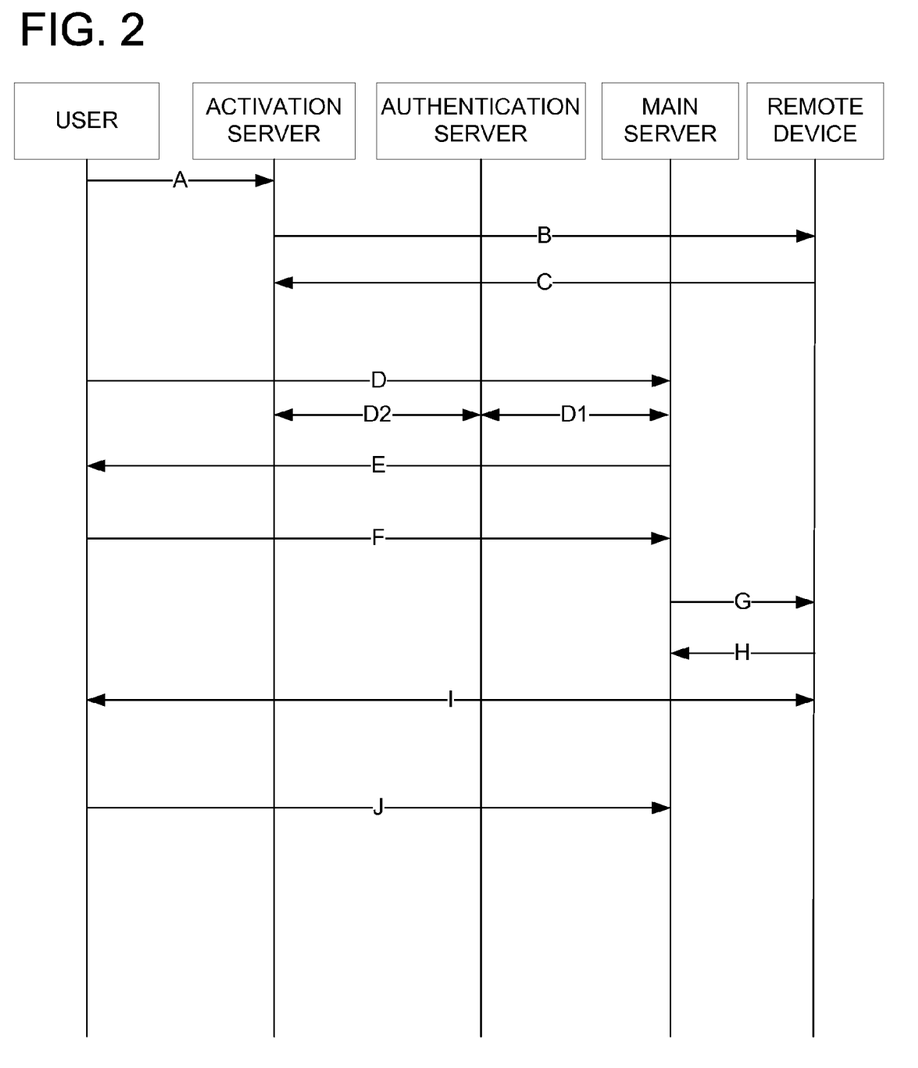
FIG. 2 is an exemplary block diagram illustrating processes within a system of a web-based remote device management according to an embodiment of the invention.

Referring now to FIG. 2, an exemplary block diagram illustrates processes within a system of a web-based remote device management according to an embodiment of the invention. Initially, the user 112 wishes to have access to the remote device 116 while being physically away from the remote device 116. Therefore, at A, the user 112 initiates a request to add or associate the remote device 116 with an online account or a web portal of the user 112. The request from the user 112 is sent to the activation server 104 for receiving a device identification (ID) associated with the remote device 116. For example, the device ID may be an identifier of the device unique to other devices managed or controlled by the user. The activation server 104 next transmits the device ID to the remote device 116 at B and the remote device may acknowledge the receipt of the device ID at C.

Once the activation server 104 receives the acknowledgement from the remote device 116 that the device ID has been received, a connection is made between the activation server 104 and the remote device 116 at C. In one example, it is presumed that the remote device 116 is operable (i.e., the remote device 116 is turned on) and is capable of a connection via the network 108 to the activation server 104. Also, the user 112 may initially be physically present at the location 2.

In one embodiment, the connection between the activation server 104 and the remote device 116 represents an availability of the remote device 116 to the user 112 when the user 112 logs on or signs into the online account or the web portal of the user 112. As such, the connection represents an online status of the remote device 116.

Once the remote device 116 is connected, the user 112, in the meantime, may have traveled to the location 1, which is remote with respect to the location 2. The user 112 then wishes to access information or data stored on the remote device 116 remotely, such as at the location 1. Hence, the user 112 operates an internet browser to access the interface 110 and requests access to the remote device 116 to the main server 102 at D. The main server 102 may next forward the request to the authentication server 106 at D1 for authenticating the user 112. At D2, the authentication server 106 may further forward the request to the activation server 104 for verifying the remote device 116 is a device that can be accessed by the user 116. For example, the authentication process between the main server 102 and the authentication server 106 may include a series of authentication transactions, such as sending a request from the main server 102 to the authentication server 106, sending a challenge from the authentication server 106 to the main server 102, sending a challenge response from the main server 102 to the authentication server 106, or the like. It is to be understood that other authentication methods or challenge-response methods may be employed without departing from the scope or spirit of the present invention. Similarly, the validation of the device ID by the activation server 104 may also involve a series of validation steps. During this process, the user 112 may also need to supply the proper credentials for being authenticated by the main server 102 or the authentication server 106 at E and F.

Once the user 112 is authenticated, the user 112 obtains an online status and the remote device 116 is also accessible to the user as a result of being validated. At G, the user 112 is able to view the remote device 116 being online and accessible by the user 112 on the interface 110. The user 112 may further select the remote device 116 at G to be connected to the remote device 116 and the remote device 116 establishes a connection with the interface 110 and its content thereof is accessible by the user 112 at the source device at H. In other words, the user 112 is now able to access the remote device 116 through the interface 110 without having any client-side (remote management) software installed on either the source device 114 or the remote device 116. In one embodiment, the remote device 116 may be presented as a folder or a directory on the interface 110.

In one embodiment, as the user 112 continues to access information or data stored on the remote device 116 at I, the connection between the interface 110 and the remote device 116 is periodically updated or monitored. For example, to ensure the smooth access of the information or data on the remote device 116, the main server 102 may maintain a certain bandwidth for the connection between the remote device 116 and the main server 102.

In another embodiment, the user 112 may further invite, add or associate another user to access the remote device 116. For example, the user 112 at J may submit a request to add a second user to access the remote device 112 from another location. The main server 102, upon receiving the request, may further authenticate the second user and register the second user on the interface (i.e., the online account of the user 112) to enable the second user to access the remote device 116. In another embodiment, the user 112 and the second user may share the access of the remote device 116 or share the data of the remote device 116 when accessing the remote device 116. In a further alternative embodiment, the user 112 may register the second user as part of a membership list which enables its members by providing access rights to the remote device 116 or other devices associated with the interface 110 of the user 112. For example, suppose the user 112 is relying on his or her child for properly maintaining and troubleshooting the remote device 116 of the user 112. As such, the user 112 may add the child of the user 112 to the interface 110 and registers the child on the member list. Alternative, the user 112 may further issue an authentication ticket for the child such that the second user may continuously access the remote device 116 absent a termination request from the user 112. The child may then periodically access the remote device 116 of the user 112 to perform various maintenance or troubleshooting operations on behalf of the user 112.

Alternative embodiments further include defining or establishing an access context of the remote device 112. For example, the access context of the remote device 116 may include a machine context and a user context. In one example, the machine context may include accesses to a full or complete access of the remote device 116. For example, as known to those skills in the art, a computing device may be defined to have an administrator access that has high privilege rights in editing or modifying various system settings, policies, controls, or the like. On the other hand, there are also various kinds of user access level where a user is given access rights or privileges less than the administrator access. Aspects of the invention take into account of these access rights and, in enabling access to the remote device 116, enable to establish the proper type of access level to the user 112 or other users. For example, a user may only have a limited privilege or access to a user-run application while an administrator may have full access, such as read, write, edit, or the like, to all files within the remote device 116.

As such, aspects of the invention provide a straight-forward remote access or management platform using a web-based interface. Embodiments of the invention eliminate the need for installing any client-side or remote management application or software for enabling the remote device management and control. Furthermore, aspects of the invention streamline the setup and access process of the remote device 116 using the interface or the web portal 110. Moreover, if the user 112 already establishes an online account with the main server 102, aspects of the invention can be seamlessly incorporated into the user's existing account and truly be connected to the user's various devices at any time and anywhere.

Figure 3:
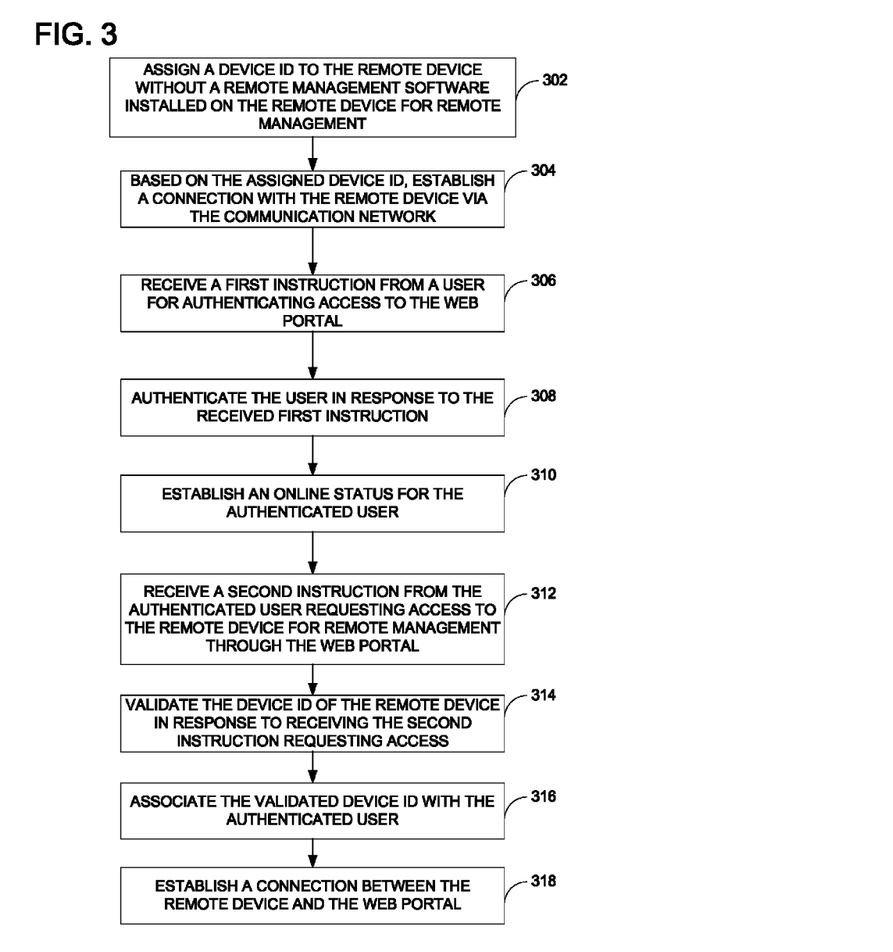
FIG. 3 is an exemplary flow chart illustrating operations of a web-based remote device management according to an embodiment of the invention.

Referring now to FIG. 3, a flow diagram illustrates operations of a web-based remote device management according to an embodiment of the invention. At 302, a device ID is assigned to a remote device without a client-side or remote management software installed on the remote device for remote management. Based on the assigned device ID, a connection is established with the remote device via a communication network, such as the network 108 at 304. At 306, a first instruction is received from a user for authenticating access to a web portal or an interface. The received instruction is originating from the source device. At 308, the user is authenticated in response to the received first instruction. At 310, an online status is established for the authenticated user. A second instruction is received from the authenticated user requesting access to the remote device for remote management through the web portal at 312. At 314, the device ID of the remote device is validated in response to receiving the second instruction requesting access. At 316, the validated device ID is associated with the authenticated user. A connection is established between the remote device and the web portal, and the remote device is accessible to the authenticated user via the web portal.

Figure 5:
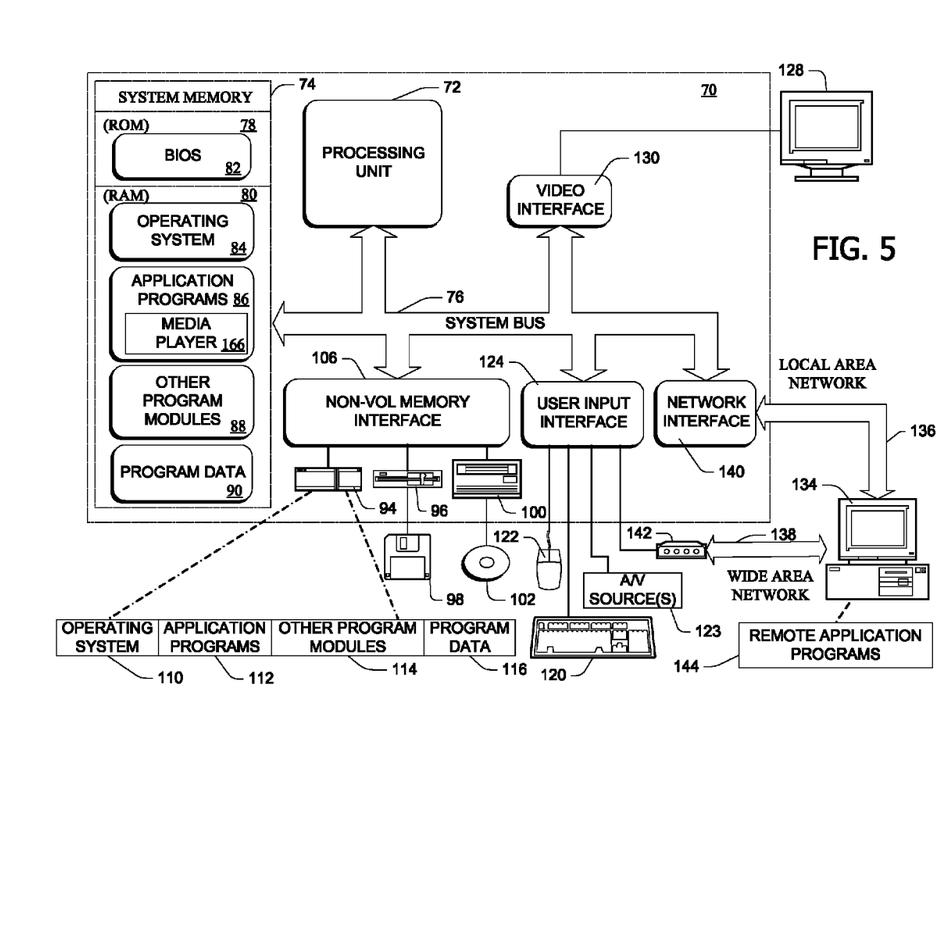
FIG. 5 is a block diagram illustrating a suitable computing system environment in which the invention may be implemented.

FIG. 5 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/ or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. For example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method of managing, via a web portal, a remote device from a source device connected to a communication network, said method comprising:
   receiving by an activation server a request from a first user server to associate the remote device with the first user for use by the first user;
   assigning by the activation server a device ID to the remote device;
   transmitting by the activation server the assigned device ID to the remote device;
   based on the assigned device ID, establishing a connection between the activation server and the remote device via the communication network;
   receiving a first instruction from the first user for authenticating access to the web portal, said web portal executing a remote management software for remote management of the remote device, wherein the remote management software is not installed on the source device or on the remote device, said received instruction originating from the source device;
   authenticating the user in response to the received first instruction;
   establishing an online status for the authenticated first user;
   receiving a second instruction from the authenticated first user requesting access to the remote device for remote management through the web portal;
   validating the device ID of the remote device in response to receiving the second instruction requesting access;
   associating the validated device ID with the authenticated first user;
   establishing a connection between the remote device and the web portal, wherein the remote device is managed by the authenticated first user via the web portal;
   receiving a third instruction from the first user for associating a second user with the web portal;
   establishing in response to the received third instruction a user context that determines a level of access privileges to the remote device granted to the second user;
   authenticating the second user for accessing the remote device in response to the received third instruction from the first user, wherein the second user is authenticated for access privileges to the remote device at a level determined by the user context established by the third instruction; and
   registering the authenticated second user with the web portal, wherein registering comprises issuing an authentication ticket to the second user, wherein the authentication ticket enabling the second user to access the remote device absent a termination request from the first user.

2. The method of claim 1, wherein receiving the first instruction from the first user for authenticating access to the web portal comprises receiving the first instruction from the first user for authenticating access to an online account of the first user.

3. The method of claim 1, wherein registering comprises registering the authenticated second user in a membership list associated with the web portal, said membership list enabling the authenticated second user for continuous access to the remote device.

4. A system for managing, via a web portal, a remote device from a source device connected to a communication network, said system comprising:
- an activation server for assigning a device ID to the remote device and for transmitting the assigned ID to the remote device, said activation server establishing a connection with the remote device via the communication network based on the assigned device ID in response to a request from a first user in a remote location;
- an interface for receiving a first instruction from a first user for authenticating access to the web portal, said web portal executing a remote management software for remote management of the remote device, wherein the remote management software is not installed on the source device or on the remote device, said received instruction originating from the source device;
- an authentication server for authenticating the first user in response to the received first instruction;
- a main server, connected with the authentication server, the interface, and the activation server, for establishing an online status on the interface for the authenticated first user;
- wherein the interface receives a second instruction from the authenticated first user requesting access to the remote device for remote management through the interface and in response to receiving the second instruction requesting access, the main server validates the device ID of the remote device by requesting the activation server to validate the assigned device ID;
- wherein the main server associates the validated device ID with the authenticated first user;
- wherein the main server establishes a connection between the remote device and the interface, wherein the remote device is accessible to the authenticated first user via the interface; and
- wherein the interface is further configured to receive a third instruction from the first user for associating a second user with the online account of the user, wherein the authentication server authenticates the second user for accessing the remote device in response to the received third instruction from the first user, said third instruction establishing a user context that determines a level of access privileges to the remote device granted to the second user, and wherein the main server issues an authentication ticket to the second user in response to authenticating the second user, wherein the authentication ticket enabling the second user to access the remote device absent a termination request from the first user, wherein the second user is granted access privileges to the remote device at a level determined by the user context established by the third instruction.

5. The system of claim 4, wherein the interface receives the first instruction from the first user for authenticating access to an online account of the first user.

6. The system of claim 5, said second user sharing access of the remote device with the first user.

7. The system of claim 6, wherein the main server further registers the authenticated second user with the online account of the first user.

8. The system of claim 7, wherein the main server registers the authenticated second user in a membership list associated with the online account, said membership list enabling the authenticated second user for continuous access to the remote device.

9. A method of managing via a web portal a remote device from a source device connected to a communication network, said method comprising:
- receiving a request from a first user to an activation server to associate the remote device with the first user for use by the first user;
- assigning a device ID to the remote device via the activation server;
- transmitting by the activation server the assigned device ID to the remote device;
- based on the assigned device ID, establishing a connection between the activation server and the remote device via the communication network;
- receiving a first instruction from the first user for authenticating access to the web portal, said web portal executing a remote management software for remote management of the remote device, wherein the remote management software is not installed on the source device or on the remote device, said received instruction originating from the source device;
- authenticating the first user in response to the received first instruction;
- establishing an online status for the authenticated first user;
- receiving a second instruction from the authenticated first user requesting access to the remote device for remote management through the web portal;
- validating the device ID of the remote device in response to receiving the second instruction requesting access;
- associating the validated device ID with the authenticated first user;
- establishing a connection between the remote device and the web portal, wherein the remote device is accessible to the authenticated first user via the web portal;
- receiving a third instruction from the first user for associating a second user with the web portal;
- establishing in response to the received third instruction a user context that determines a level of access privileges to the remote device granted to the second user; and
- authenticating the second user for accessing the remote device in response to the received third instruction from the first user, wherein the second user is authenticated for access privileges to the remote device at a level determined by the user context established by the third instruction.

10. The method of claim 9, wherein receiving the first instruction from the first user for authenticating access to the web portal comprises receiving the first instruction from the first user for authenticating access to an online account of the first user.

11. The method of claim 9, further comprising receiving a third instruction from the first user for associating a second user with the web portal; and authenticating the second user for accessing the remote device in response to the received third instruction from the first user, said second user sharing access of the remote device with the first user based on the established access context.

12. The method of claim 9, further comprising registering the authenticated second user with the web portal.

13. The method of claim 12, wherein registering comprises registering the authenticated second user in a membership list associated with the web portal, said membership list enabling the authenticated second user for continuous access to the remote device.

14. The method of claim 12, wherein registering comprises issuing an authentication ticket to the second user, wherein the authentication ticket enabling the second user to access the remote device absent a termination request from the first user.

* * * * *